United States Patent
Evennou et al.

(10) Patent No.: US 9,955,347 B2
(45) Date of Patent: Apr. 24, 2018

(54) TECHNIQUE OF PAIRING IN A WIRELESS NETWORK

(71) Applicant: ORANGE, Paris (FR)

(72) Inventors: Frederic Evennou, Lyons (FR); Sami Sidhoum, Grenoble (FR)

(73) Assignee: ORANGE, Paris (FR)

( * ) Notice: Subject to any disclaimer, the term of this patent is extended or adjusted under 35 U.S.C. 154(b) by 220 days.

(21) Appl. No.: 14/763,406

(22) PCT Filed: Feb. 14, 2014

(86) PCT No.: PCT/FR2014/050307
§ 371 (c)(1),
(2) Date: Jul. 24, 2015

(87) PCT Pub. No.: WO2014/128390
PCT Pub. Date: Aug. 28, 2014

(65) Prior Publication Data
US 2015/0365823 A1 Dec. 17, 2015

(30) Foreign Application Priority Data

Feb. 21, 2013 (FR) .................................. 13 51479

(51) Int. Cl.
*H04L 9/08* (2006.01)
*H04W 12/04* (2009.01)
(Continued)

(52) U.S. Cl.
CPC ...... *H04W 12/04* (2013.01); *G06F 17/30876* (2013.01); *H04L 63/0428* (2013.01);
(Continued)

(58) Field of Classification Search
CPC ... H04W 12/04; H04W 28/021; H04W 84/18; H04W 84/20; G06F 17/30876; H04L 63/061; H04L 63/0428; H04L 9/08
See application file for complete search history.

(56) References Cited

U.S. PATENT DOCUMENTS

| 8,364,129 B1 * | 1/2013 | Beyer, Jr. .......... H04M 1/72572 455/414.2 |
| 2004/0168081 A1 * | 8/2004 | Ladas ................... H04L 63/061 726/8 |

(Continued)

FOREIGN PATENT DOCUMENTS

| WO | 2006079953 A1 | 8/2006 |
| WO | 2010017281 A2 | 2/2010 |

OTHER PUBLICATIONS

Written Opinion of the International Searching Authority from PCT/FR2014/050307.

*Primary Examiner* — Jayesh Jhaveri
(74) *Attorney, Agent, or Firm* — Haverstock & Owens LLP

(57) ABSTRACT

The invention relates to a technique of pairing a device (10-12) with a co-ordinating entity (20) of a private wireless network (1). The co-ordinating entity obtains an identifier of the device to be paired and a temporary network identifier specific to the device. The co-ordinating entity then configures itself on standby awaiting the device identified on the temporary network. The device to be paired transmits a request for association with the temporary network to the co-ordinating entity on the temporary network. The co-ordinating entity verifies that the device that transmitted the request for association corresponds to the device identified and then transmits to it on the temporary network an encryption key associated with the private wireless network and an identifier of the private network, then instructs a toggling of the device from the temporary network to the private wireless network. The device to be paired then
(Continued)

restarts on the private network and transmits a request for association to the private network on the private network. The co-ordinating entity and the device identified are then associated.

14 Claims, 2 Drawing Sheets

(51) Int. Cl.
    *G06F 17/30*     (2006.01)
    *H04W 28/02*     (2009.01)
    *H04W 84/18*     (2009.01)
    *H04L 29/06*     (2006.01)
    *H04W 84/20*     (2009.01)

(52) U.S. Cl.
    CPC ......... *H04L 63/061* (2013.01); *H04W 28/021* (2013.01); *H04W 84/18* (2013.01); *H04W 84/20* (2013.01)

(56) References Cited

U.S. PATENT DOCUMENTS

| | | | |
|---|---|---|---|
| 2005/0135286 A1* | 6/2005 | Nurminen | H04W 84/18 370/310 |
| 2011/0090896 A1* | 4/2011 | Bradley | H04W 24/02 370/350 |
| 2012/0257543 A1* | 10/2012 | Baum | H04W 84/22 370/255 |
| 2012/0284785 A1* | 11/2012 | Salkintzis | G06F 21/43 726/7 |
| 2013/0148573 A1* | 6/2013 | Boland | H04W 8/005 370/328 |
| 2015/0036539 A1* | 2/2015 | Townend | H04W 48/12 370/254 |
| 2017/0041860 A1* | 2/2017 | Ogawa | H04W 48/16 |

\* cited by examiner

TECHNIQUE OF PAIRING IN A WIRELESS NETWORK

The invention relates to a pairing technique in a wireless network, at the end of which a terminal device is associated with a coordinating entity.

In the context of home automation applications, low consumption wireless networks are constructed. Such networks are notably known as wireless personal area networks, WPAN. The range of these networks is of the order of a few tens of meters. This type of network generally makes it possible to link terminal devices to a central or coordinating entity. The terminal devices (or "end devices") are for example sensors (such as temperature probes, lamps), or actuators (such as lamp control buttons), etc. The coordinating entity is, for example, an access gateway to a communication network. The ZigBee protocol, as defined by the ZigBee alliance, is a high level protocol allowing communication between the end devices and the coordinating entity based on the IEEE 802.15.4 standard for the lower layers. The communication between the end devices and the coordinating entity of a wireless personal area network is performed over a current communication channel.

To set up a new end device in the wireless personal area network, it is necessary to associate or pair the new end device with the coordinating entity. The coordinating entity is, initially, configured to accept a pairing with new end devices. In a second stage, the new end device performs a scan of the different communication channels in order to detect a coordinating entity accepting the pairing of new appliances within its private network. Once a network is detected, the new end device associates with the coordinating entity thereof. In a case where a plurality of coordinating entities are present in one and the same environment, for example in an apartment block, the new end device may be wrongly paired with another personal area network. Furthermore, during this pairing, the new end device receives information concerning the configuration of the communication channel, notably an encryption key used in the wireless personal area network. Such information is received protected by a key which is common to all the personal area networks. The encryption key used in the wireless personal area network can thus be intercepted by a third party during this first transmission.

In order to improve this situation, commission tools are offered by constructors. The patent document WO2010/017281 describes such a tool. The commissioning tool can be incorporated in the coordinating entity. This tool accesses a database of encryption keys respectively associated with end devices. After the pairing of the end device with the coordinating entity, a secured channel is established between the coordinating entity and the paired end device. When a symmetrical encryption is used for the secured channel, the commissioning tool memorizes the encryption key associated with the end device. When an asymmetrical encryption is used for the secured channel, the coordinating entity memorizes a public key associated with the private key of the end device. The encryption key used in the wireless personal area network is then transmitted by means of the secured channel established. However, this solution requires access by the coordinating entity to the database, which is shared between different players, via a communication network. Furthermore, in this solution, the coordinating entity is forced to open its personal area network to the pairing of any new end device. In the case of the abovementioned apartment block, new end devices may be wrongly paired with the coordinating entity. They may even be unknown in the database.

One of the aims of the invention is to remedy the inadequacies/drawbacks of the prior art and/or provide improvements thereto.

According to a first aspect, the subject of the invention is a method for pairing a device with a coordinating entity of a wireless private network, this method comprising the following steps implemented by the coordinating entity:
 a step of obtaining of an identifier of said device and of a temporary network identifier specific to the device;
 a first step of reception over the temporary network of a request for association with the temporary network originating from the identified device;
 a step of transmission over the temporary network to said identified device of an encryption key associated with the wireless private network and an identifier of the private network;
 a step of commanding of a switchover of said device from the temporary network to the wireless private network:
 a second step of reception over the private network of an association request originating from said identified device, the coordinating entity and the device then being associated.

More specifically, the method comprises a step of waiting of the identified device on the temporary network triggered following the obtaining of said identifiers. Furthermore, the step of transmission over the temporary network is triggered after verification that the device having transmitted the association request corresponds to the identified device.

Thus, by virtue of the pairing method, the coordinating entity and the device to be paired meet on a temporary or commissioning network, specific to the device to be paired. On this temporary network, the device to be paired receives characteristics of the private network, such as an identifier of the private network and the encryption key associated with the private network. This makes it possible to guarantee that the end device will directly select the private network on which it will be commissioned. The end device will thus not attempt to be paired with another private network located in its environment. Moreover, the encryption key is not transmitted over the private network, which adds a first level of security. Furthermore, the exchange of keys takes place before the association of the appliance on the operational private network. Contrary to the patent document WO2010/017281, there is no need to access a central database. The commissioning can thus be performed locally. Since the temporary network is specific to the device to be paired, only the latter is accepted by the coordinating entity on the temporary network.

Furthermore, the private network is never open to the association. In effect, the device to be paired directly rejoins the identified private network. The same applies for the temporary network.

In a particular embodiment, to command the switchover of the device from the temporary network to the private network, the coordinating entity transmits a restart attribute, which indicates to the device the behavior that it should adopt on each restart, followed by a restart command.

The different embodiments or features mentioned below can be added independently or in combination with one another, to the steps of the pairing method as defined previously.

According to a particular feature of the pairing method, a temporary encryption key is obtained by the coordinating entity in association with the temporary network identifier and the encryption key associated with the private network is protected by means of the temporary encryption key.

The protection of the features of the private network by means of the temporary encryption key makes it possible to add a second level of security to this pairing technique.

In a particular first embodiment, the coordinating entity can communicate simultaneously over both private and temporary networks. In this case, there is no interruption of service on the operational private network, during the exchanges over the temporary network.

In a particular second embodiment, the coordinating entity can communicate only with one of the two networks. In this case, the pairing method further comprises a step of switchover of the coordinating entity from the private network to the temporary network that it forms, prior to the first reception step, and a second step of switchover of the coordinating entity from the temporary network to the private network, prior to the second reception step.

According to a particular feature of the pairing method, at the end of a waiting period and in the absence of reception of an association request originating from the device, the coordinating entity accepts only to communicate over the private network.

In case of commissioning failure, the temporary network is deactivated. This saves on the resources of the coordinating entity and makes it possible not to offer any weakness to malicious third parties.

According to another particular feature of the pairing method, the coordinating entity obtains, from a terminal, the temporary network identifier via a secured channel.

According to a second aspect, the invention relates also to a coordinating entity of a wireless private network, arranged to communicate with at least one device, said entity comprising:
 a module for obtaining an identifier of a device to be paired and a temporary network identifier specific to said device;
 a first module for receiving, over the temporary network, a request for association with the temporary network originating from the identified device;
 a module for transmitting, over the temporary network to said identified device, an encryption key associated with the wireless private network and an identifier of the private network, after verification that the device having transmitted the association request corresponds to the identified device;
 a module for commanding a switchover of said device from the temporary network to the wireless private network;
 a second module for receiving, over the private network, a request for association with the private network originating from said device, the coordinating entity and the identified device then being associated.

The first reception module is activated following the obtaining of the identifiers.

The advantages stated for the method according to the first aspect can be directly transposed to the coordinating entity.

In a particular embodiment, the coordinating entity further comprises a third reception module, arranged to receive, from a terminal, the temporary network identifier via a secured channel.

According to a third aspect, the invention further relates to a system forming a wireless private network, comprising at least one coordinating entity according to the second aspect and at least one wireless end device, arranged to associate with the coordinating entity, said device having a unique identifier and a temporary network identifier which is specific to it, said device comprising:
 a transmission module, arranged to transmit, over a network, an association request to the coordinating entity;
 a reception module, arranged to receive, over the temporary network, an encryption key associated with the wireless private network, an identifier of the private network and a command to switchover from the temporary network to the wireless private network;
 a control module, arranged to order a transmission of a first request for association with the temporary network to the coordinating entity over the temporary network and, on reception of the switchover command, to order a transmission of a second request for association with the private network to the coordinating entity over the private network.

According to a fourth aspect, the invention relates to a program for a coordinating entity, comprising program code instructions intended to control the execution of the steps of the pairing method described previously, when said program is run by said entity and a storage medium that can be read by a coordinating entity on which a program for a coordinating entity is stored.

The advantages stated for the pairing method according to the first aspect can be directly transposed to the program for a coordinating entity and to the storage medium.

The invention will be better understood from the following description of particular embodiments of the pairing technique, with reference to the attached drawings in which.

Figure 1:
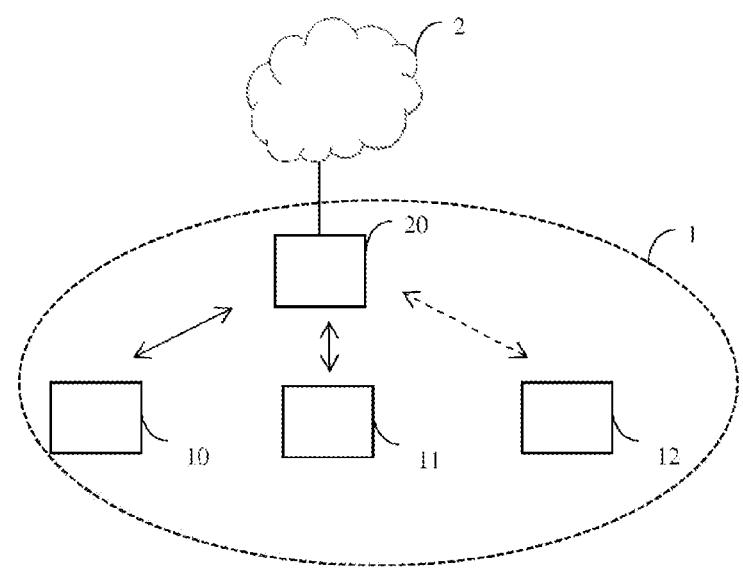
FIG. 1 represents a wireless private network.

FIG. 1 represents a wireless private network 1, in which end devices 10, 11, 12 are associated with a coordinating entity 20. The wireless private network 1 is, for example, a wireless personal area network WPAN. The coordinating entity is, for example, an access gateway to a communication network 2. The end devices 10-12 are sensors or actuators. A sensor makes it possible for example to measure a temperature. An actuator makes it possible for example to control a lamp.

Hereinbelow, the case of the ZigBee protocol will be assumed, which is based on the IEEE 802.15.4 standard for the lower layers. The communication between the devices 10-12 and the coordinating entity is performed over a current communication channel, specific to the wireless network. This current communication channel is chosen from one of the sixteen possible channels in the 2.4 to 2.4835 GHz frequency band.

The private network 1 is identified by a network identifier Id_NW_OP, coded as "Extended PAN Id" information element on 64 bits. An encryption key Kr is associated with this private network 1 and makes it possible to protect the exchanges in the private network 1. This encryption key Kr is specific to the private network 1.

A device 10-12 is identified by a device identifier Id_D. This is, for example, an MAC (media access control) address.

The term "association" or "pairing" is used to describe a set of steps at the end of which a device 10-12 communicates with the coordinating entity 20 over the current communication channel in a secured manner. The exchanges are then protected by means of the encryption key Kr associated with the private network 1. The device 10-12 then belongs to the private network 1. In FIG. 1, the devices 10 and 11 are already paired with the coordinating entity 20 and communicate therewith by protecting their exchanges by means of the encryption key Kr associated with the private network 1. The device 12 is described as "to be paired", which means that it does not have information associated with the private network 1.

In a first embodiment, a device 10-12 to be paired has a temporary network associated with it which is specific to it. This temporary network is characterized by:

a temporary network identifier Id_NW_C, coded also in the form of an "extended PAN Id" information element;

an encryption key Kc associated with the temporary network.

The temporary network corresponds to a network on which the device 12 to be paired and the coordinating entity 20 meet in order to perform the steps making it possible to provide this device with the information necessary to access the private network 1. These steps are known by the term "commissioning". This meeting network is temporary and exists only for a short time, corresponding to the time needed to commission the device to be paired. By way of illustration, the period of existence of the temporary network is less than one minute.

The device 12 to be paired has the characteristics of this temporary network available. The characteristics are for example memorized in a memory module of the device.

In one embodiment, the characteristics are also displayed on a tag bearing a bar code in two dimensions (or QR code, which stands for "Quick Response Code"), this tag being affixed to the device. A terminal, mobile for example, can then read these characteristics using a reading application ("QR Reader").

In another embodiment, the characteristics are memorized in an RFID (Radio Frequency Identification) tag affixed to the device to be paired. A terminal can then read these characteristics in near field using an application.

Figure 2:
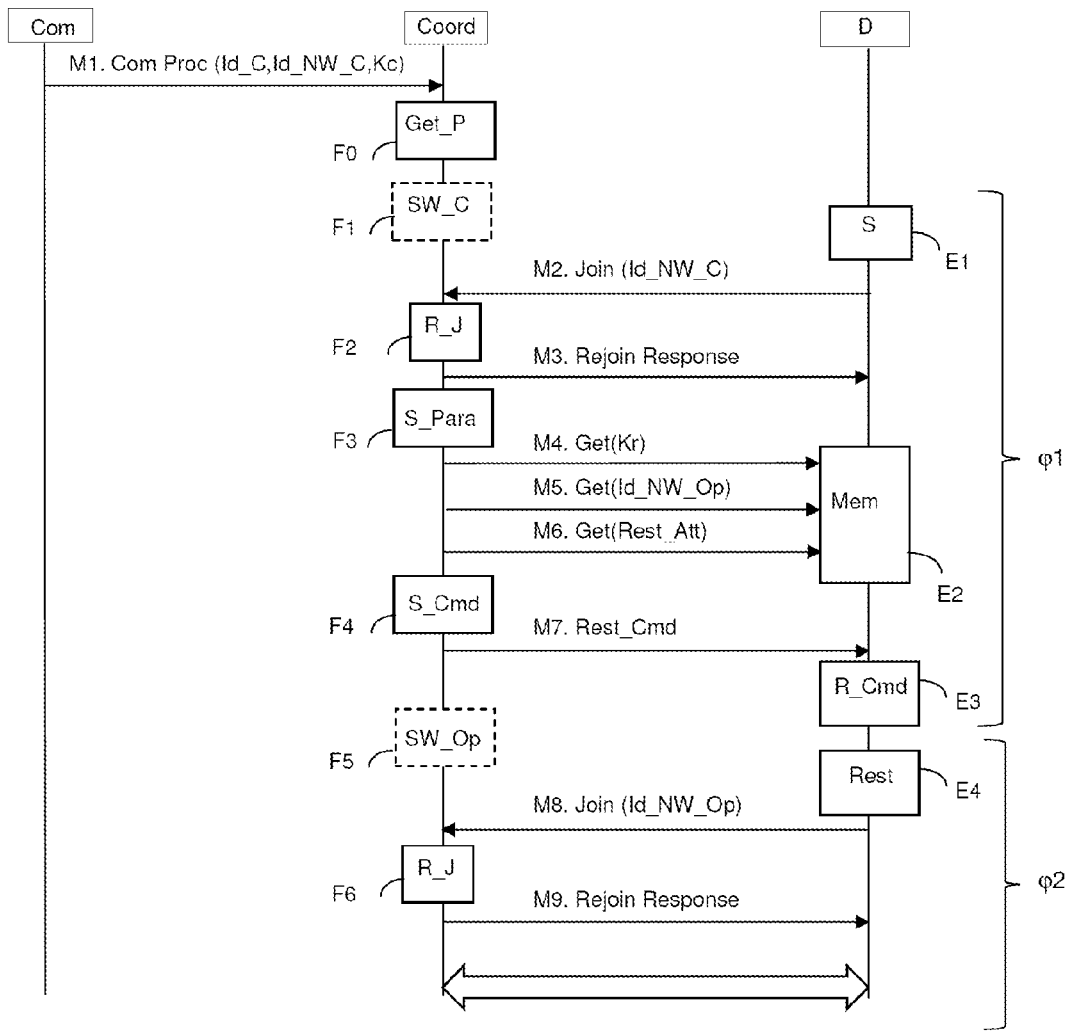
FIG. 2 represents steps of the methods according to a particular embodiment of the invention.

There now follows a description of the pairing method, as it is implemented by the coordinating entity 20, and the communication method, as it is implemented by a device 12 to be paired, in a first particular embodiment, in relation to FIG. 2.

In this first embodiment, the coordinating entity 20 is notably arranged to communicate with two wireless networks simultaneously.

In a first step F0 of the pairing method, the coordinating entity 20 obtains an identifier of the device 12 to be paired and the characteristics of the temporary network, specific to this device 12. In one embodiment, the coordinating entity 20 obtains this information in a message M1 transmitted by means of a secured channel established with a terminal. This is, for example, a smart mobile terminal (or "Smartphone") of the user. The secured channel is, for example, a WiFi ("Wireless Fidelity") communication channel established between the terminal and the coordinating entity 20. This makes it possible to commission the device 12 locally in a simple manner, without requiring a dedicated tool or a technician to perform the commissioning operations.

It is recalled here that, in this first embodiment, the characteristics of the temporary network comprise a temporary network identifier Id_NW_C and an encryption key Kc.

The steps implemented on the temporary network form a first phase φ1 of the commissioning of the device 12.

The coordinating entity 20 is configured to await reception over a communication channel over which the exchanges in the temporary network will be carried out. The coordinating entity 20 thus forms the temporary network required and waits for the device 12 to be paired to join it. The coordinating entity 20 arms a waiting delay. It is stressed here that the coordinating entity 20 is configured quasi-immediately (taking into account the processing times on the coordinating entity) awaiting reception of information over the temporary network following the obtaining of the identifier of the device to be paired and the characteristics of the temporary network. At the end of a waiting period and in the absence of reception of an association request originating from the identified device, the coordinating entity 20 leaves the temporary network and accepts only to communicate over the private network.

It is recalled here that, in this first embodiment, the coordinating entity 20 remains operational on the private network 1.

The user of the device then locally triggers the pairing. This involves, for example, pressing on a key of the device. In a first step E1 of the communication method, the device 12 to be paired performs a scan of the different communication channels in order to detect the coordinating entity 20 and transmits a request for association with the temporary network by means of the communication channel of the temporary network, to the coordinating entity 20. This request for association with the temporary network corresponds to a "Rejoin" message M2 of the ZigBee protocol and includes the identifier of the temporary network Id_NW_C.

This request for association with the temporary network originating from the device 12 to be paired is received by the coordinating entity 20 during a reception step F2 of the pairing method. The coordinating entity 20 checks to see if the network identifier does indeed correspond to that of the temporary network. When this check is negative, the coordinating entity 20 disregards the association request received.

When this check is positive, in a step F3 of the pairing method, the coordinating entity 20 acknowledges the reception of the association request with an acknowledgment message M3. The message M3 corresponds to a "Rejoin Response" message of the ZigBee protocol. Still in this step F3, the coordinating entity 20 checks to see if the device which has transmitted the association request does indeed correspond to the expected device, that is to say the one identified by the device identifier. By way of example, in a so-called "Ping" mechanism, an "Echo" message is transmitted to the device 12. If it does indeed correspond to the recipient of the "Echo" message, the device 12 transmits an "Echo Reply" message.

Otherwise, the device having transmitted the association request not being the expected device, the coordinating entity 20 resumes awaiting reception over the communication channel over which the exchanges in the temporary network will be performed.

When the device having transmitted the association request is indeed the expected device, the coordinating entity 20 transmits to the device 12 identified over the temporary network the encryption key Kr associated with the wireless private network and the identifier of the private network Id_NW_Op. This information is, for example, transmitted in the form of two messages M4 and M5. The message M5 corresponds for example to a "write attribute" message of the ZigBee protocol. The coordinating entity 20 transmits, also during this step F3, in a message M6, a restart attribute. This restart attribute makes it possible to indicate to the device 12 the actions to be implemented on each restart. More specifically, on each restart, the device 12 must rejoin the private network 1, from which it has received the characteristics. In this first embodiment, the encryption key Kr associated with the private network, the identifier of the private network Id_NW_Op and the restart attribute are protected by means of the temporary encryption key Kc. Thus, a malicious third party cannot receive this information.

These messages M4, M5 and M6, more specifically the identifier of the private network, the encryption key associated with the private network and the restart attribute, are received by the device 12 over the temporary network in a step E2 of the communication method. Still in this step E2, the device 12 memorizes the information received. Thus, on each restart, the device 12 rejoins the private network identified by Id_NW_Op and has the encryption key Kr associated with the private network available to it. There is no need to transmit this information to it again. This transmission of the encryption key Kr associated with the private network over the temporary network is unique. The encryption key Kr is not transmitted subsequently over the private network 1. Thus, the transmission of the encryption key Kr is performed in a secured manner, on the one hand because of its transmission over a temporary network specific to the device 12 to be paired, and on the other hand because of its transmission protected by a temporary encryption key Kc specific to the device 12 to be paired.

In a step F4 of the pairing method, the coordinating entity 20 commands a restart of the device 12 to be paired. The transmission of the restart attribute in the message M6 in the step F3 and the restart command in the step F4 thus form a command to switch over the device 12 to be paired from the temporary network to the wireless private network.

This restart command is received by the device 12 in a step E3 of the communication method.

The first phase φ1 of the commissioning of the device 12 is then finished. The temporary network is no longer operational.

The following steps implemented on the operational network form a second phase φ2 of the commissioning of the device 12. At the end of this second phase, the device 12 is associated with the coordinating entity 20 and is operational on the private network 1.

In a step E4 of the communication method, the device 12 restarts. This restart leads to a switchover of the device 12 from the temporary network to the private network 1 by virtue of the restart attribute received in the step E2.

Still in this step E4 of the communication method, the device 12 performs a scan of the different communication channels in order to detect the coordinating entity 20 and transmits a request for association with the private network to the coordinating entity 20 by means of the communication channel of the private network. This request for association with the private network corresponds to a "Rejoin" message M8 of the ZigBee protocol and comprises the identifier of the private network Id_NW_Op.

It is recalled here that, for this first embodiment, the coordinating entity 20 has remained operational on the private network 1.

This association request is received during a step F6 of the pairing method. The coordinating entity 20 checks that the network identifier does indeed correspond to that of the private network 1. When this check is positive, the coordinating entity 20 acknowledges, by an acknowledgment message M9, the reception of the association request. The message M9 corresponds to a "Rejoin Response" message of the ZigBee protocol.

In a particular embodiment, the coordinating entity 20 checks to see if the device which has transmitted this association request does indeed correspond to the expected device, that is to say the one identified by the device identifier. By way of example, a "Ping" mechanism is once again used. This makes it possible to notify the user of the device that the commissioning has been performed. Otherwise, the device having transmitted the association request not being the expected device, the coordinating entity 20 resumes awaiting reception over the communication channel over which the exchanges in the private network are performed.

The second phase φ2 of the commissioning of the device 12 is then finished.

At the end of all of these steps, the coordinating entity 20 and the device 12 are then paired or associated on the private network 1. The device 12 is thus directly associated over the private network, without the risk of the latter being associated with a third party network, and in a secured manner. The shared encryption key Kr associated with the private network 1 has been transmitted in a secured manner, on the one hand because of its transmission over a temporary network specific to the device 12 to be paired, and on the other hand because of its transmission protected by a temporary encryption key Kc specific to the device 12 to be paired. The shared encryption key Kr associated with the private network has not been transmitted over the operational private network. The commissioning has been performed over a temporary network, specific to the device to be paired, distinct from the operational private network and has been done prior to the association of the device with the coordinating entity over the operational private network. The operational private network has never been opened to accommodate any device but has accommodated only devices that have been identified and with which it has previously dialogued over dedicated temporary networks.

A second embodiment of the pairing technique is now described, still in relation to FIG. 2. In this second embodiment, the coordinating entity 20 is arranged to communicate with a single wireless network.

The coordinating entity 20 implements the step F0 of the pairing method and obtains an identifier of the device 12 to be paired and the characteristics of the temporary network, specific to this device 12.

In a step F1 of the pairing method, the coordinating entity 20 leaves the private network 1, forms the temporary network and waits for the terminal to connect thereto. In this second embodiment, the coordinating entity 20 is no longer operational on the private network 1. However, the interruption is of short duration, that is to say the duration necessary for the device 12 and the coordinating entity 20 to meet on the temporary network.

The steps E1, E2 and E3 of the communication method, described previously, are implemented by the device 12. In parallel, the steps F2 and F3 of the pairing method, described previously, are implemented by the coordinating entity 20. At the end of these steps, the device 12 has received the identifier of the private network, the encryption key Kr associated with the private network and the restart attribute.

During the step F4 of the pairing method, the coordinating entity 20 commands a restart of the device 12 to be paired.

In a step F5 of the pairing method, the coordinating entity 20 switches over from the temporary network to the private network 1 and is configured to await reception over the communication channel associated with the private network. The coordinating entity 20 becomes operational again on the private network 1.

Once the restart command is received (step E3), the device 12 restarts (step E4) on the private network and transmits, over the private network, the association request to the coordinating entity 20.

This association request is received during the step F6 of the pairing method.

At the end of these steps, the coordinating entity 20 and the device 12 are then paired or associated. This second embodiment offers the same advantages as those described previously in relation to the first embodiment.

In a third embodiment, in the step F0, the coordinating entity 20 obtains an identifier of the device 12 to be paired and determines the characteristics of the temporary network from the identifier of the device 12 using an algorithm shared between the device 12 and the coordinating entity 20. The other steps are unchanged. This third embodiment makes it possible to implement the pairing technique with only an exchange of the identifier of the device to be paired. This third embodiment also offers the same advantages as those described previously in relation to the first embodiment.

In a fourth embodiment, the characteristics of the temporary network are stored on an RFID tag affixed to the device 12 and the coordinating entity 20 obtains them (step F0) by reading, in near field, the RFID tag. The other steps of the pairing technique are unchanged.

In the first, second, third and fourth embodiments described previously, the characteristics of the temporary network comprise a temporary network identifier Id_NW_C and an encryption key Kc associated with the temporary network.

In a variant to these four embodiments, the characteristics of the temporary network comprise only the identifier of the temporary network Id_NW_C. In this variant, the encryption key Kr associated with the private network and the identifier of the private network Id_NW_Op are transmitted in clear over the temporary network. It is recalled here that the temporary network dedicated to the commissioning of the device 12 already makes it possible to ensure a first level of security.

In the embodiments described previously, the identifier of the private network and the restart attribute are protected by means of the temporary encryption key. As a variant to these four embodiments, the identifier of the private network Id_NW_Op and the restart attribute are protected by means of the encryption key Kr associated with the private network.

Figure 3:
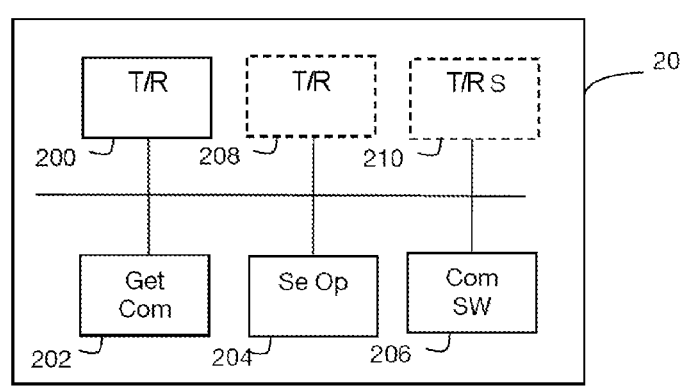
FIG. 3 represents a coordinating entity according to a particular embodiment of the invention.

There now follows a description of a coordinating entity in a particular embodiment of the invention with reference to FIG. 3. Such a coordinating entity 20 notably comprises:
- a module 202 for obtaining an identifier of a device to be paired, a temporary network identifier specific to the device and an encryption key associated with the temporary network, also specific to the device;
- a first transmission and reception module 200, arranged to communicate with a device to be paired on the temporary network, notably to receive an association request originating from the identified device;
- a module 204 for transmitting, over the temporary network to the identified device, an encryption key associated with the wireless private network, an identifier of the private network via the first transmission and reception module 200;
- a module 206 for commanding a switchover of the identified device from the temporary network to the wireless private network.

The first module 200 is activated following the obtaining of the identifier of the device to be paired and the characteristics of the temporary network.

In a particular embodiment, the transmission module 204 is further arranged to transmit a restart attribute to the identified device and the module 206 is arranged to command a restart on the device, thus commanding the switchover of the identified device from the temporary network to the wireless private network.

In the first embodiment, the coordinating entity 20 further comprises:
- a second module 208 for transmission/reception over the private network, arranged notably to receive an association request originating from the identified device.

The transmission module 204 is further arranged to protect the transmission of the encryption key associated with the wireless private network and the identifier of the private network by means of the encryption key associated with the temporary network.

In the second embodiment, the first transmission/reception module 200 is further arranged to switch over from one network to another and thus to communicate with at least one device over the private network 1. The association request transmitted by the identified device over the private network 1 is then received by means of this first transmission/reception module 200. The coordinating entity 20 does not then comprise the second transmission/reception module 208.

In a particular embodiment, the coordinating entity 20 further comprises a third reception module 210, arranged to receive, from a terminal, the temporary network identifier, the encryption key associated with the temporary network and the identifier of the terminal equipment via a secured channel. This is, for example, a WiFi wireless communication channel.

In a particular embodiment, the module 202 obtains only the identifier of the device to be paired and determines the characteristics of the temporary network from the identifier of this device using an algorithm shared with the device to be paired.

Figure 4:
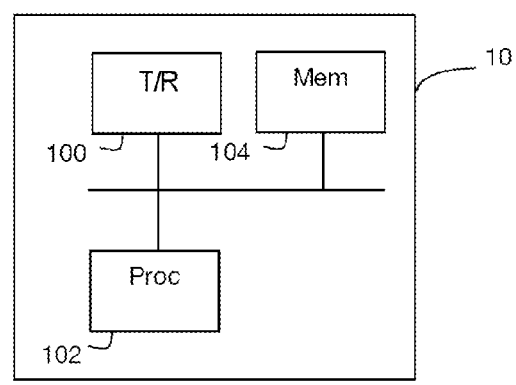
FIG. 4 represents a device according to a particular embodiment of the invention.

There now follows a description of a device 10-12 in a particular embodiment of the invention with reference to FIG. 4. Such a device 10-12 has a temporary network identifier which is specific to it and comprises notably:
- a transmission and reception module 100, arranged to communicate with a coordinating entity over a communication channel associated with a network;
- a processing module 102, arranged to:
  transmit, over a network, an association request to the coordinating entity;
  receive, over the temporary network, an encryption key associated with the wireless private network, an identifier of the private network and a command for a switchover from the temporary network to the wireless private network;
  command a transmission of a first association request to the coordinating entity over the temporary network and, on reception of the switchover command, to command a transmission of a second association request to the coordinating entity over the private network.

In a particular embodiment, the device 10-12 further comprises a module 104 for storing the temporary network identifier.

In a particular embodiment, the storage module 104 is further arranged to store an encryption key associated with the temporary network and specific to the device.

In a particular embodiment, the module 102 is further arranged to determine the characteristics of the temporary network from the identifier of the device using an algorithm shared with the coordinating entity 20.

The invention is implemented by means of software and/or hardware components. In this respect, the term "module" can in this document correspond equally to a software component, a hardware component or a set of hardware and/or software components, suitable for implementing a function or a set of functions, according to what is described previously for the module concerned.

A software component corresponds to one or more computer programs, one or more subroutines of a program, or, more generally, any element of a program or software. Such a software component is stored in memory then loaded and executed by a data processor of a physical entity and is likely to access the hardware resources of this physical entity (memories, storage media, communication bus, input/output electronic boards, user interfaces, etc).

Similarly, a hardware component corresponds to any element of a hardware assembly. It can be a programmable or non-programmable hardware component, with or without an integrated processor for software execution. It is, for example, an integrated circuit, a chip card, an electronic card for the execution of firmware, etc.

In a particular embodiment, the modules 202, 204, 206 are arranged to implement the method described previously. They are preferably software modules comprising software instructions to have the steps of the pairing method described previously executed, implemented by the coordinating entity. The invention therefore relates also to:

a program for a coordinating entity, comprising program code instructions intended to control the execution of the steps of the pairing method described previously, when said program is run by said entity;

a storage medium that can be read by a coordinating entity on which the program for an entity is stored.

In a particular embodiment, the module 102 is arranged to implement the method described previously. It is preferably software modules comprising software instructions to have the steps of the communication method described previously executed, implemented by the device to be paired. The invention therefore relates also to:

a program for a device, comprising program code instructions intended to control the execution of the steps of the communication method described previously, when said program is run by said device;

a storage medium that can be read by a device on which the program for a device is stored.

The software modules can be stored in or transmitted by a data medium. The latter can be a hardware storage medium, for example a CD-ROM, a magnetic diskette or a hard disk, or else a transmission medium such as an electrical, optical or radio signal, or a telecommunication network.

The invention relates also to a system forming a wireless private network, comprising at least one coordinating entity as described previously and at least one device as described previously.

The embodiments have been described in the context of the ZigBee protocol, based on the IEEE 802.15.4 standard for the lower layers. The embodiments are also applicable to other radio technologies, such as DECT ULE, ZWave, Enocean, Wifi. The embodiments are particularly advantageous in the case of devices that do not have any screen enabling a user to validate the association with a coordinating entity.

These embodiments are also applicable in the context of highly-secured networks, because the exchanges are conducted over the networks which are never open to the association for other devices, and all the exchanges are permanently secured by a non-public encryption key.

The invention claimed is:

1. A method for pairing a device with a coordinating device of a wireless private network, said method comprising the following steps implemented by the coordinating device:
   a step of obtaining of an identifier of said device and of a temporary network identifier specific to the device;
   a step of waiting for the device identified on the temporary network, said step being triggered following the obtaining of said device identifier and said temporary network identifier specific to the device;
   a first step of reception over the temporary network of a request for association with the temporary network originating from the identified device;
   a step of verification that the device having transmitted the association request corresponds to the identified device;
   a step of transmission over the temporary network to said identified device of an encryption key associated with the wireless private network and of an identifier of the private network;
   a step of commanding of a switchover of said device from the temporary network to the wireless private network; and
   a second step of reception over the private network of an association request originating from said identified device, the coordinating device and the device then being associated.

2. The pairing method as claimed in claim 1, in which a temporary encryption key is obtained in association with the temporary network identifier and the encryption key associated with the private network is protected by means of the temporary encryption key.

3. The method as claimed in claim 1, further comprising a step of switchover of the coordinating device from the private network to the temporary network that it forms, prior to the first reception step, and a second step of switchover of the coordinating device from the temporary network to the private network, prior to the second reception step.

4. The method as claimed in claim 1, in which, at the end of a waiting period and in the absence of reception of an association request originating from the device, the coordinating device accepts only to communicate over the private network.

5. The method as claimed in claim 1, in which the coordinating device obtains from a terminal the temporary network identifier via a secured channel.

6. A coordinating device of a wireless private network, arranged to communicate with at least one device, said device comprising:
   a non-transitory computer-readable medium storing an identifier module, a first transmission/reception module, a second transmission/reception module, a verifying module and a switchover module, wherein:
      the identifier module obtains an identifier of a device to be paired and a temporary network identifier specific to said device;
      the first transmission/reception module receives, over the temporary network, a request for association with the temporary network originating from the identified device, activated following the obtaining of said device identifier and said temporary network identifier specific to the device;

the verifying module verifies that the device having transmitted the association request corresponds to the identified device and transmits, over the temporary network to said identified device, an encryption key associated with the wireless private network and an identifier of the private network;

the switchover module commands a switchover of said device from the temporary network to the wireless private network;

the second transmission/reception module receives, over the private network, a request for association with the private network originating from said device, the coordinating device and the identified device then being associated.

7. The coordinating device as claimed in claim 6, further comprising a third reception module stored on the non-transitory computer-readable medium and, arranged to receive, from a terminal, the temporary network identifier via a secured channel.

8. A system forming a wireless private network, comprising at least one coordinating device and at least one wireless device, arranged to be associated with the coordinating device, said device having a unique identifier and a temporary network identifier which is specific to it, said coordinating device comprising:

a non-transitory computer-readable medium storing an identifier module, a first transmission/reception module, a second transmission/reception module, a verifying module and a switchover module, wherein:

the identifier module obtains an identifier of a device to be paired and a temporary network identifier specific to said device;

the first module receives, over the temporary network, a request for association with the temporary network originating from the identified device, activated following the obtaining of said device identifier and said temporary network identifier specific to the device;

the verifying module verifies that the device having transmitted the association request corresponds to the identified device and transmits, over the temporary network to said identified device, an encryption key associated with the wireless private network and an identifier of the private network;

the switchover module commands a switchover of said device from the temporary network to the wireless private network;

the second transmission/reception module receives, over the private network, a request for association with the private network originating from said device, the coordinating device and the identified device then being associated, said device comprising a non-transitory computer-readable medium storing a transmission module, a reception module and a control module, wherein:

the transmission module transmits over a network an association request to the coordinating device;

the reception module receives over the temporary network an encryption key associated with the wireless private network, an identifier of the private network and a command to switch over from the temporary network to the wireless private network; and the control module orders a transmission of a first request for association with the temporary network to the coordinating device over the temporary network and, on reception of the switchover command, orders a transmission of a second request for association with the private network to the coordinating device over the private network.

9. A non-transitory computer-readable storage medium comprising program code instructions stored thereon for pairing a coordinating device of a wireless private network, comprising program code instructions to be run by said device intended to control the execution of the steps of the method, said method comprising the following steps implemented by the coordinating device:

a step of obtaining of an identifier of said device and of a temporary network identifier specific to the device;

a step of waiting for the device identified on the temporary network, said step being triggered following the obtaining of said device identifier and said temporary network identifier specific to the device;

a first step of reception over the temporary network of a request for association with the temporary network originating from the identified device;

a step of verification that the device having transmitted the association request corresponds to the identified device;

a step of transmission over the temporary network to said identified device of an encryption key associated with the wireless private network and of an identifier of the private network;

a step of commanding of a switchover of said device from the temporary network to the wireless private network;

a second step of reception over the private network of an association request originating from said identified device, the coordinating device and the device then being associated.

10. The non-transitory computer-readable storage medium as claimed in claim 9, wherein the program is stored on a storage medium that can be read by a coordinating device of a wireless private network.

11. The non-transitory computer-readable storage medium as claimed in claim 9, in which a temporary encryption key is obtained in association with the temporary network identifier and the encryption key associated with the private network is protected by means of the temporary encryption key.

12. The non-transitory computer-readable storage medium as claimed in claim 9, further comprising a step of switchover of the coordinating device from the private network to the temporary network that it forms, prior to the first reception step, and a second step of switchover of the coordinating device from the temporary network to the private network, prior to the second reception step.

13. The non-transitory computer-readable storage medium as claimed in claim 9, in which, at the end of a waiting period and in the absence of reception of an association request originating from the device, the coordinating device accepts only to communicate over the private network.

14. The non-transitory computer-readable storage medium as claimed in claim 9, in which the coordinating device obtains from a terminal the temporary network identifier via a secured channel.

* * * * *